United States Patent
Nagano

(10) Patent No.: US 8,698,927 B2
(45) Date of Patent: Apr. 15, 2014

(54) IMAGE-PICKUP ELEMENT, AND IMAGE-PICKUP APPARATUS AND CAMERA SYSTEM CAPABLE OF DETECTING A FOCUS STATE

(75) Inventor: Akihiko Nagano, Ichihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/471,894

(22) Filed: May 15, 2012

(65) Prior Publication Data

US 2012/0293707 A1  Nov. 22, 2012

(30) Foreign Application Priority Data

May 18, 2011  (JP) .................................. 2011-111016

(51) Int. Cl.
*H04N 3/16* (2006.01)
*H04N 9/04* (2006.01)
(52) U.S. Cl.
USPC .......................................... 348/294; 348/345
(58) Field of Classification Search
USPC .................. 348/245, 294, 345, 349
See application file for complete search history.

(56) References Cited

U.S. PATENT DOCUMENTS

| | | | | |
|---|---|---|---|---|
| 2011/0096211 A1* | 4/2011 | Oikawa et al. | ................. | 348/294 |
| 2011/0273599 A1* | 11/2011 | Murata | .......................... | 348/294 |
| 2011/0273602 A1* | 11/2011 | Takamiya et al. | ............. | 348/302 |
| 2012/0057057 A1* | 3/2012 | Amano | .......................... | 348/294 |

FOREIGN PATENT DOCUMENTS

| | | | |
|---|---|---|---|
| JP | 2009-244854 A | 10/2009 | |
| JP | 2010-117679 A | 5/2010 | |

* cited by examiner

*Primary Examiner* — Gevell Selby
(74) *Attorney, Agent, or Firm* — Carter, DeLuca, Farrell & Schmidt LLP

(57) ABSTRACT

An image-pickup element includes an image-pickup pixel configured to photoelectrically convert light from an image-pickup lens to generate an image of an object, and a first focus detection pixel and a second focus detection pixel configured to receive light having passed through part of an area of an exit pupil of the image-pickup lens, and an electrode part of the first focus detection pixel and an electrode part of the second focus detection pixel are arranged at ends of a photoelectrical conversion part that are opposite to each other in a pupil diving direction of the first focus detection pixel and the second focus detection pixel.

7 Claims, 11 Drawing Sheets

IMAGE-PICKUP ELEMENT, AND IMAGE-PICKUP APPARATUS AND CAMERA SYSTEM CAPABLE OF DETECTING A FOCUS STATE

BACKGROUND OF THE INVENTION

1. Field of the Invention

The present invention relates to an image-pickup element capable of detecting a focus state of an image-pickup lens, and an image-pickup apparatus and a camera system having the same.

2. Description of the Related Art

Conventionally, some focus detection methods used in a digital camera which is an image-pickup apparatus are a contrast detection method used in a video camera or a compact camera, a phase difference detection method used in a single-lens reflex camera and the likes.

The single-lens reflex camera includes a flip-up mirror for guiding an object light into a finder optical system in order that a photographer observes the object through an image-pickup lens. The flip-up mirror is configured by a half mirror which transmits a part of light, and the light which has passed through the flip-up mirror is guided into a focus detection apparatus for a phase difference method in order to perform a focus detection of the image-pickup lens. The focus detection apparatus is configured by a group of lenses and a group of imaging sensors that re-images a light flux passing through different pupil areas of the image-pickup lens. When an image taking using a memory is performed, the flip-up mirror is retracted from an image-pickup optical path. Therefore, the focus detection in a conventional phase difference detection method cannot be performed while the image taking using the memory, such a film and an image-pickup element, is performed.

When a moving image is observed or stored in a camera including the image-pickup element as the memory, a focusing method in a contrast detection method is generally used. The focusing method in the contrast detection method extracts a high frequency component of an image taken by the image-pickup element while a focus lens of the image-pickup lens is moved in an optical axis direction, and performs the focusing by detecting a lens position at which the contrast becomes peak. This focusing method cannot perform the focusing with high speed because contrasts of the images are compared while the focus lens is moved.

To solve the above problems, this applicant discloses in Japanese Laid-Open No. 2010-117679 a camera that limits a light-receivable pupil area of the image-pickup lens by limiting a photoelectrical conversion area of a part of the focus detection pixels, which form a CMOS image-pickup element, and performs a focus detection by the phase difference method. In the Japanese Laid-Open No. 2010-117679, a microlens that forms a part of the focus detection pixel is configured so that a pupil of the image-pickup lens and a wire electrode have a conjugate relationship. As a result, a light flux that enters a photoelectrical conversion part is shield by the wire electrode, and thereby the light-receivable pupil area of the image-pickup lens is limited.

However, a microlens that forms the image-pickup element requires to be configured so that the pupil of the image-pickup lens and the photoelectrical conversion part substantially has a conjugate relationship. Therefore, this applicant discloses in Japanese Laid-Open No. 2009-244854 an image-pickup element that limits the light-receivable pupil area of the image-pickup lens by providing a light shielding part on the photoelectrical conversion part instead of light-shielding by the wire electrode that is disposed at a position distant from the photoelectrical conversion part. A metallic material, such a tungsten, is used in the light shielding part.

In a part of area on the photoelectrical conversion part of the CMOS image-pickup element, a transfer electrode is formed of polysilicon. When the polysilicon as the transfer electrode is covered from above in the tungsten as light shielding part, the height of a sensor increases and the light-receiving efficient of the CMOS image-pickup element (light-receiving angle characteristic or Fno proportionality) lowers.

For these problems, to shorten a distance from the microlens to the photoelectrical conversion part (that is to say, to decrease the height of the sensor), it is preferable to form the light shielding part formed in the focus detection pixel with similar thickness so as not to overlap the transfer electrode.

Therefore, this inventor invents a configuration that arrays the light shielding part and the transfer electrode on the photoelectrical conversion part in a direction perpendicular to an optical axis direction so that the light shielding part does not overlap the transfer electrode in the optical axis direction. In this case, the light shielding part and the transfer electrode can be arranged so as not to overlap each other in the optical axis direction, and the distance from the microlens to the photoelectrical conversion part can be shorten, thereby increasing the light-receiving efficient of the CMOS image-pickup element.

However, in this case, the polysilicon forming the transfer electrode is not covered in the tungsten forming the light shielding part, and is exposed to a light having passed through the image-pickup lens. The spectral transmission characteristics of the polysilicon forming the transfer electrode indicates a characteristic in that a short wavelength hardly transmits in blue side, but the transmittance increases as the wavelength increases and approaches a red side. Therefore, this case has a disadvantageous in that the focus detection cannot be performed with high accuracy because of the effect of a light passing the transfer electrode, depending on the position relationship between an open formed by the light shielding part and the transfer electrode.

SUMMARY OF THE INVENTION

The present invention provides an image-pickup element capable of performing focus detection with high accuracy by reducing an effect due to a transmission of light in a transfer electrode while assuring a light-receiving efficient of a CMOS image-pickup element, and an image-pickup apparatus and a camera system having the same.

An image-pickup element as one aspect of the present invention includes an image-pickup pixel configured to photoelectrically convert light from an image-pickup lens to generate an image of an object, and a first focus detection pixel and a second focus detection pixel configured to receive light having passed through part of an area of an exit pupil of the image-pickup lens, the first focus detection pixel and the second focus detection pixel each include a photoelectrical conversion part, an electrode part arranged at an end of the photoelectrical conversion part so as to cover at least part of an area of the photoelectrical conversion part, and a light shielding part that has an opening and is configured to cover an area different from the at least part of the area of the photoelectrical conversion part, and the electrode part of the first focus detection pixel and the electrode part of the second focus detection pixel are arranged at ends of the photoelectrical conversion part that are opposite to each other in a pupil diving direction of the first focus detection pixel and the second focus detection pixel.

Further features and aspects of the present invention will become apparent from the following description of an exemplary embodiment with reference to the attached drawings.

DETAILED DESCRIPTION OF THE PREFERRED EMBODIMENTS

An exemplary embodiment of the present invention will be described below with reference to the accompanied drawings.
[Embodiment]

Figure 1:
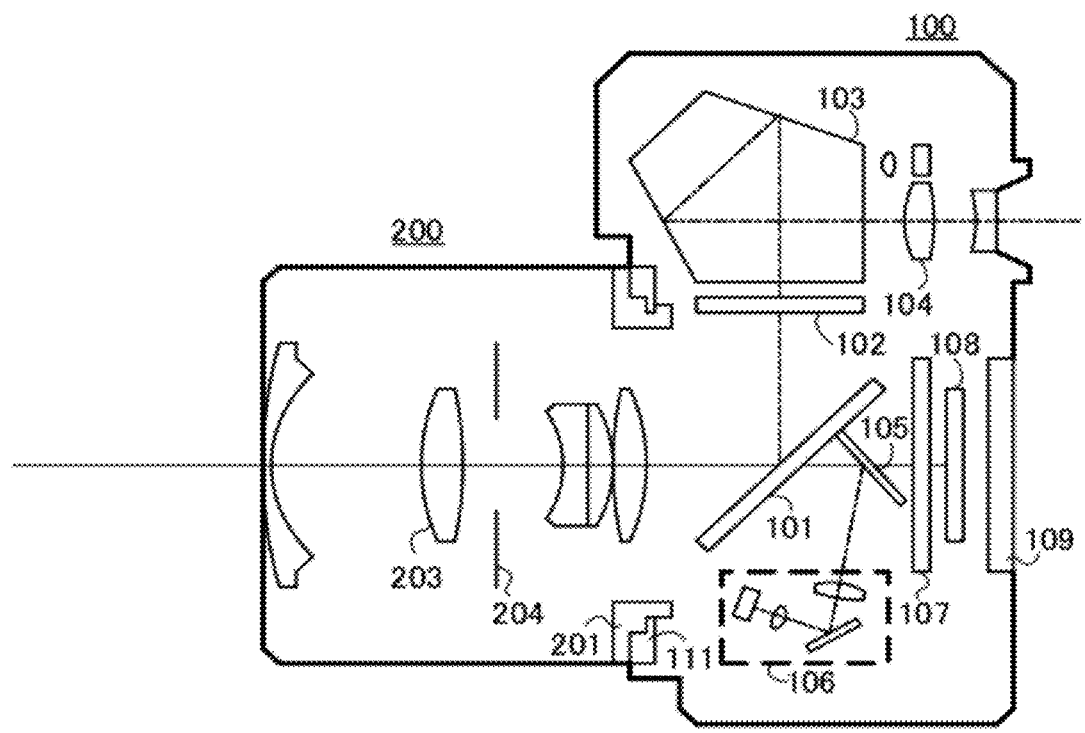
FIG. 1 is a configuration diagram of an optical apparatus (camera system) of the present invention.
Figure 2:
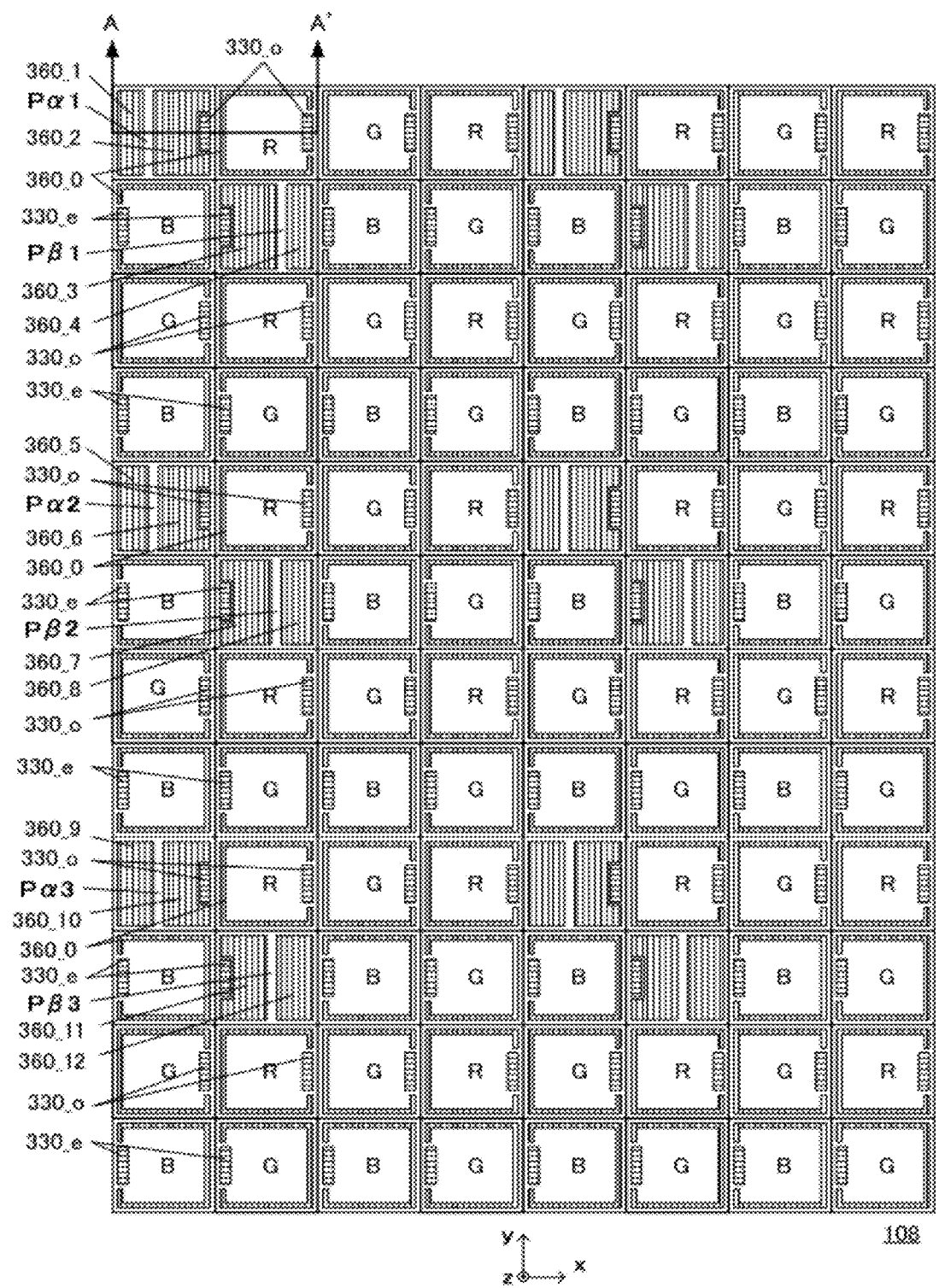
FIG. 2 is a partial plain diagram of an image-pickup element of the present invention.
Figure 3:
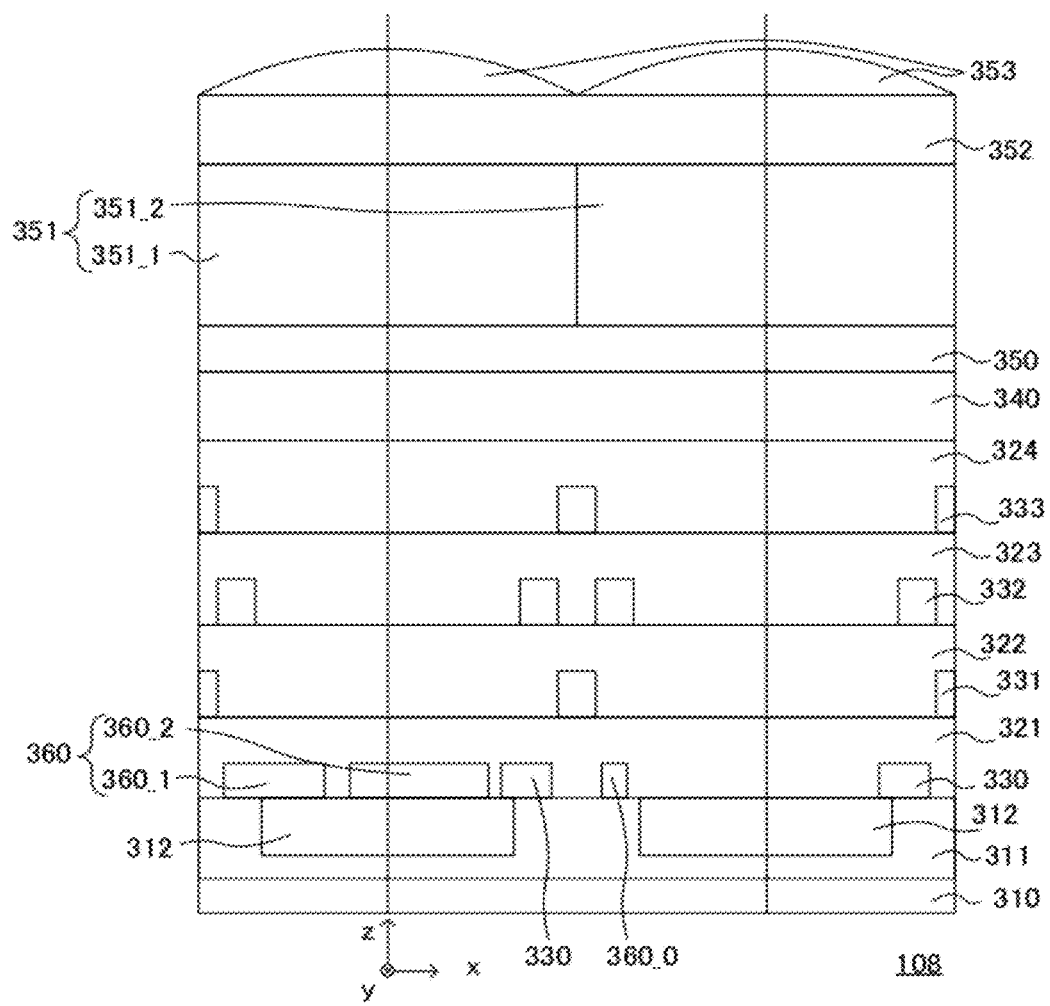
FIG. 3 is a partial cross-section diagram of the image-pickup element of the present invention.
Figure 8A:
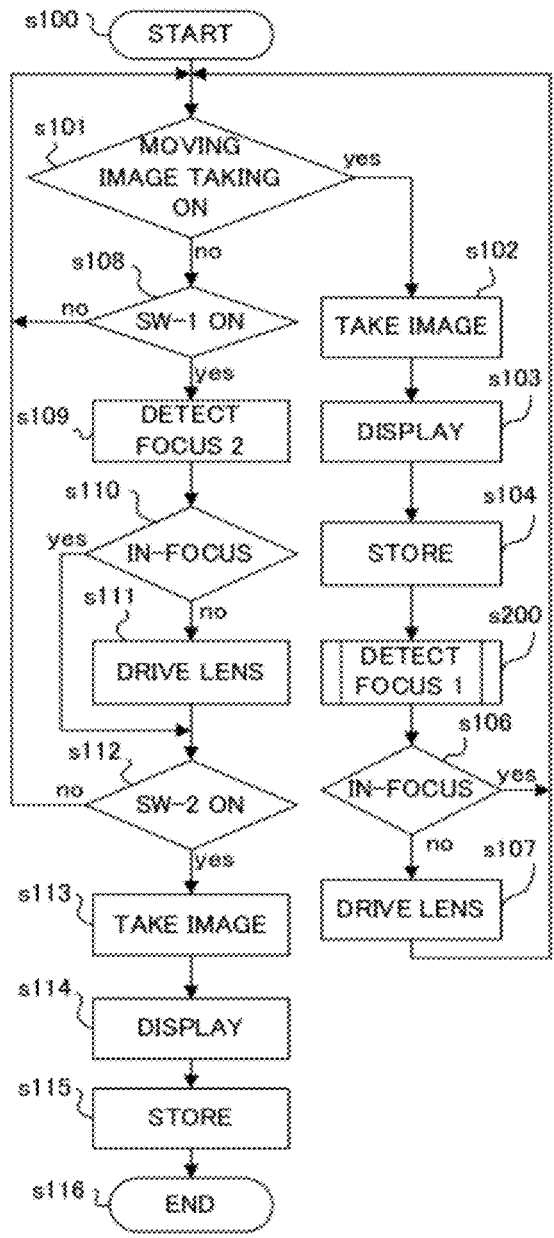
FIGS. 8A-8B are flow charts of an image-pickup operation of the optical apparatus of the present invention.
Figure 8B:
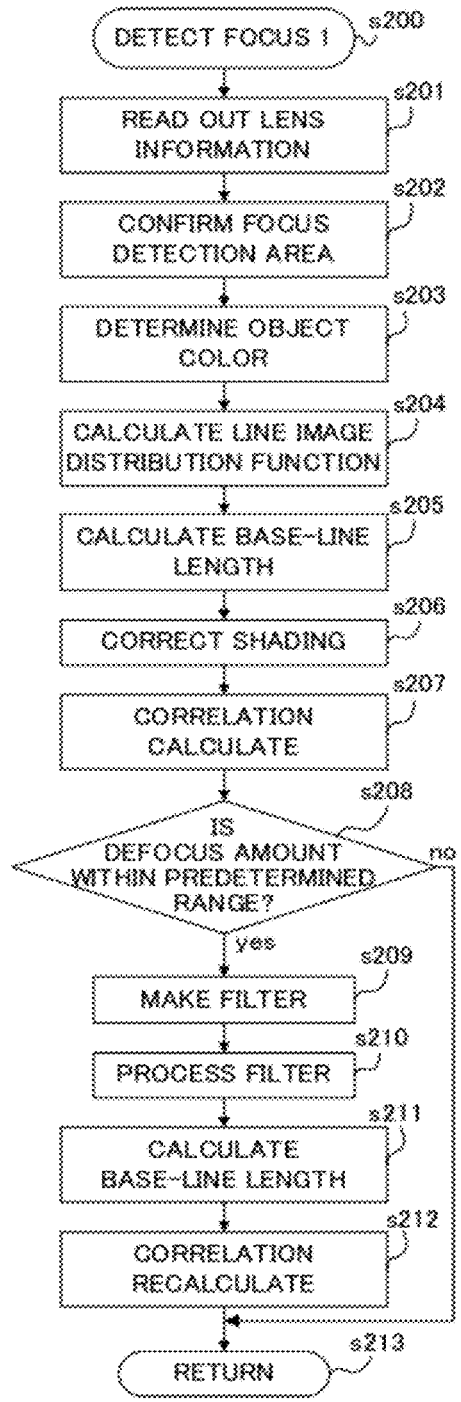
Figure 9A:
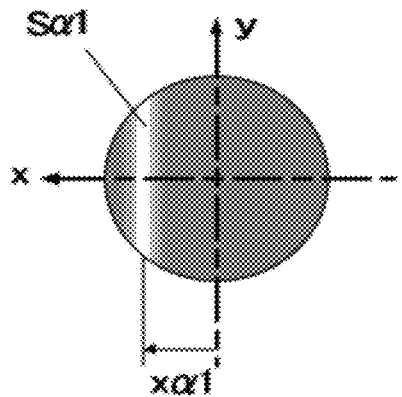
FIGS. 9A-9F are diagrams for explaining the light-receiving distribution of the focus detection pixel arranged in the image-pickup element in a state of narrowing down an aperture of an image-pickup lens which the optical apparatus of the present invention includes.
Figure 9B:
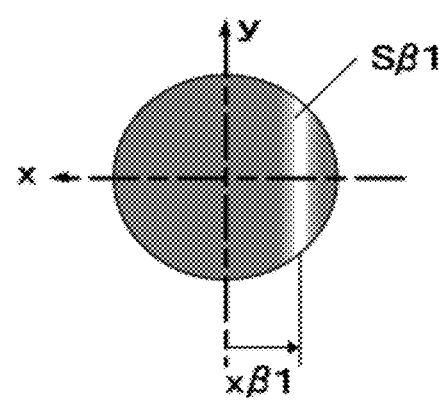
Figure 9C:
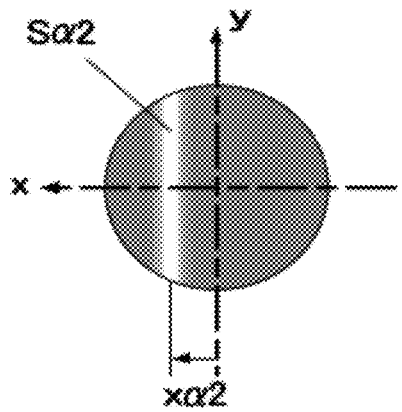
Figure 9D:
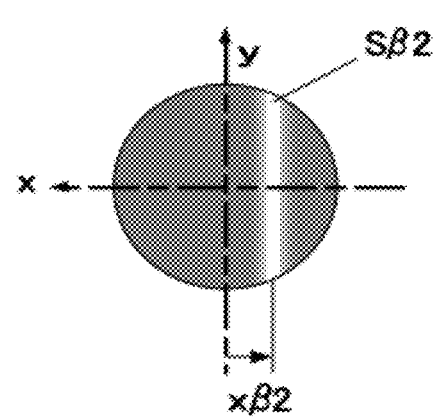
Figure 9E:
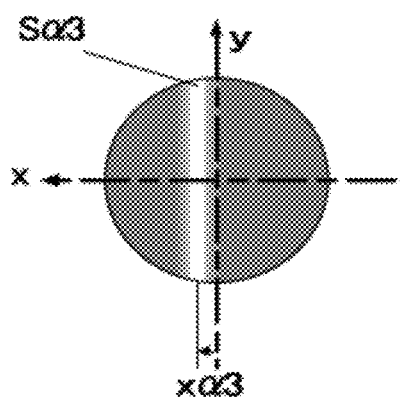
Figure 9F:
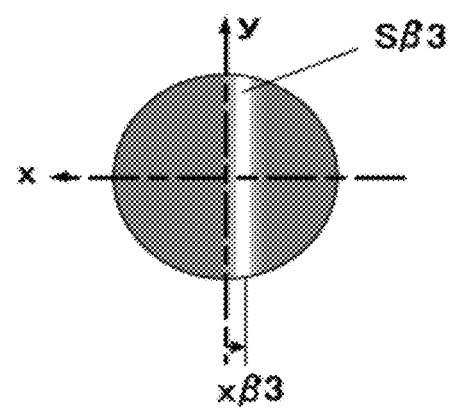
Figure 10A:
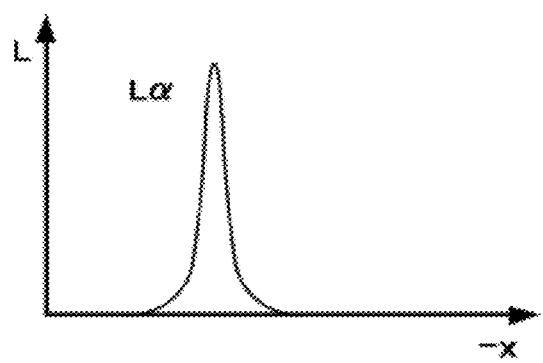
FIGS. 10A-10B are diagrams for explanting projections of the light-receiving distribution of FIGS. 9A-9F.
Figure 10B:
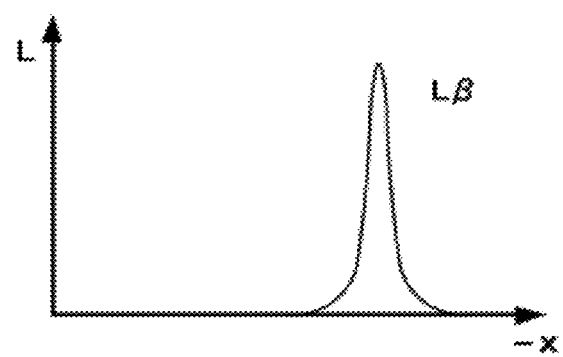

FIGS. 1-10B illustrate an embodiment of the present invention, FIG. 1 is a configuration diagram of a digital camera that is an optical apparatus including an image-pickup element of the present invention, FIG. 2 is a partial plain diagram of an image-pickup element of the present invention, FIG. 3 is a partial cross-section diagram of the image-pickup element of the present invention, and FIGS. 4A-4E are diagrams for explaining a manufacture process of the image-pickup element of the present invention. FIGS. 5A-5F are diagrams for explaining a light-receiving distribution of a focus detection pixel arrayed in the image-pickup element of the present invention, FIGS. 6A-6D are diagrams for explaining projections of the light-receiving distribution of FIGS. 5A-5F, FIG. 7 is a block diagram of an electrical circuit of a camera of the present invention, and FIGS. 8A-8B are flow charts of a camera operation of the present invention. FIGS. 9A-9F are diagrams for explaining the light-receiving distribution of the focus detection pixel arrayed in the image-pickup element in a state of narrowing down an aperture of an image-pickup lens included in the optical apparatus of the present invention, and FIGS. 10A-10B are diagrams for explaining projections of the light-receiving distribution of FIGS. 9A-9F.

FIG. 1 illustrates, as the digital camera (camera system) of the present invention, a single-lens reflex digital camera where the image-pickup lens (interchangeable lens) 200 is detachable for a camera body 100 via a camera side mount 111 and a lens side mount 201.

The image-pickup lens 200 is configured from a plurality of lens units (for example, lens 203) and an aperture 204, and an object light having passed through the image-pickup lens 200 reflects on a flip-up mirror 101 of the camera 100 and converges adjacent to a focus plain 102. Further, an object light that diffuses and transmits on the focus plain 102 is guided into an eye of a photographer (not illustrated) via a penta roof prism 103 and an eye lens 104.

The flip-up mirror 101 is a half mirror, and a part of the object light that has passed through the flip-up mirror 101 is reflected on an sub-mirror 105 and is guided into a focus detection apparatus 106. The focus detection apparatus 106 has a well-known configuration that detects a focus state of the image-pickup lens 200 based on an image generated by light having passed through different pupil areas of the image-pickup lens 200.

An image-pickup element (image sensor, CMOS image-pickup element) 108 is arranged on a proposed imaging plain of the image-pickup lens 200.

The camera of the present invention can take a moving image, the flip-up mirror 101 and the sub-mirror 105 are retracted from an image-pickup optical path when the moving image is taken, and a shutter 107 is set in an opening state. At this time, an image taken in the image-pickup element 108 is visible with a liquid display element 109.

Next, a configuration of the image-pickup element 108 will be described.

FIG. 2 is a partial plain diagram of the image-pickup element, and FIG. 3 is a partial cross-section diagram of the image-pickup element 108.

FIG. 3 is a cross-section diagram in an A-A' plain illustrated in the partial plain diagram of the image-pickup element 108 of FIG. 2.

In the image-pickup element 108, a photoelectrical conversion part 312 is formed inside of a silicon substrate 310. A signal charge generated in the photoelectrical conversion part 312 is transformed to a floating diffusion part (not illustrated) by a transfer electrode (electrode part) 330 formed in an end of the photoelectrical conversion part 312 so as to cover at least a part of area of the photoelectrical conversion part 312. The transfer electrode 330 is usually formed of polysilicon. Moreover, light shielding parts 360_1, 360_2 (hereinafter a pair of light shielding parts is collectively called "light shielding part 360" also) for limiting an incident light are formed on the photoelectrical conversion part 312 of pixels in the left side of FIG. 2. The light shielding parts 360_1, 360_2 are formed of tungsten, and the light shielding part 360_2 is formed so as not to overlap the transfer electrode 330. That is, the light shielding part 360 of the present invention covers an area different from at least a part of area of the photoelectrical conversion part that the transfer electrode 330 covers to avoid the transfer electrode 330. In other words, the light shielding parts 360 are arrayed along with the transfer electrode 330 on the photoelectrical conversion part 312 in a direction perpendicular to an optical axis direction, and are arranged so as not to overlap the transfer electrode 330 in the optical axis direction. Further, a light shielding part 360_0 is formed on the periphery of each pixel to prevent stray light.

The signal charge transformed to the floating diffusion part is output outside via electrodes 331 and 332. An interlayer dielectric film 321 is formed between the photoelectrical conversion part 312 and the electrode 331, but has no increase of the thickness thereof because the light shielding part 360_2 is formed so as not to overlap the transfer electrode 330, and the light shielding part 360 and the transfer electrode 330 substantively have the same thickness. As a result, the lowering of the light-receiving efficient (in particular, the incident angle characteristic) of the image-pickup element 108 is prevented.

An interlayer dielectric film 322 is formed between the electrodes 331 and 332. Further, an interlayer dielectric film 323 is formed between the electrodes 332 and 333.

In the light incidence side of the electrode 333, an interlayer dielectric film 324 is formed, and in addition a passivation film 340 and a planarizing layer 350 are formed. In the light incidence side of the planarizing layer 350, color filter layers 351_1 and 351_2 (hereinafter collectively called "color filter layer 351" also), a planarizing layer 352, and a microlens 353 are formed. A power of the microlens 353 is set so that the pupil of the image-pickup lens 200 and the photoelectrical conversion part 312 are substantively conjugated with each other.

In this embodiment, a cross-section diagram of a pixel located in the center of the image-pickup element 108 is illustrated, and the microlens 353 is arranged at the substantial center of the pixel.

The object light that has passed through the image-pickup lens 200 collects adjacent to the image-pickup element 108 arranged on the proposed imaging plain of the camera 100. The light that has reached each pixel of the image-pickup element 108 is refracted by the microlens 353 and collects in the photoelectrical conversion part 312. Each electrode 331, 332, 333 laminated in the optical axis direction of the image-pickup element 108 is arranged so as not to shield the incident light as possible.

The pixel in the right side of FIG. 3 is an image-pickup pixel usually used in taking an image, and is configured so as to receive light from a whole pupil area of the image-pickup lens 200.

On the other hand, the pixel in the left side of FIG. 3 is a focus detection pixel used when a focus state of the image-pickup lens 200 is detected. This focus detection pixel receives light having passed through a part of the exit pupil of the image-pickup lens 200. The light shielding parts 360_1 and 360_2 are formed on the photoelectrical conversion part 312 of the pixel in the left side of FIG. 3, thereby receiving light flux passing a part of the pupil of the image-pickup lens 200. A color filter 351_1 having no color and no light absorption is formed to improve the light-receiving efficient in the focus detection pixel.

Next, a pixel placement of the image-pickup element 108 will be described in reference to the plain diagram of FIG. 2.

The light shielding part 360_0 for preventing stray light is arranged around each pixel that forms the image-pickup element 108. Moreover, the characters of "R", "G", "B" described in each pixel represent a hue of a color filter. The pixels containing the character of "R" transmit light having a red component, the pixels containing the character of "G" transmit light having a green component, and the pixels containing the character of "B" transmit light having a blue component.

When an array of the color filters is Bayer array, a picture element is configured from pixels of "R", "B" and two pixels of "G", but a focus detection pixel capable of detecting a focus of the image-pickup lens 200 is assigned in a part of a pixel corresponding to "G" in the image-pickup element 108 of the present invention.

In FIG. 2, each of Pα1, Pβ1, Pα2, Pβ2, Pα3, and Pβ3 denotes an opening of the light shielding part 360 of a pixel for detecting a focus state of the image-pickup lens 200, and has a rectangular shape having a long axis in y direction of FIG. 2. In this embodiment, transfer electrodes 330_o and 330_e (hereinafter collectively called "transfer electrode 330" also) are arranged in a position displaced in a direction (so-called "correlated calculation direction" or "pupil divide direction") perpendicular to a long direction (y direction in FIG. 2) of the opening of the light shielding part 360. In this embodiment, the transfer electrodes 330_o and 330_e are arranged at ends of the photoelectrical conversion part 312 that are opposite to each other in the pupil divide direction of the focus detection pixel.

At this time, with regard to the transfer electrodes 330_o and 330_e, their positions arranged corresponding to a position of the opening of the light shielding part 360 for the center of the focus detection pixel. In other words, the transfer electrode 330_o is arranged at an end of the photoelectrical conversion part 312 that is opposite to a side where the opening (for example, Pα1) of the light shielding part for the center of the focus detection pixel is arranged. Moreover, the transfer electrode 330_e is arranged at an end of the photoelectrical conversion part 312 that is opposite to a side where the opening (for example, Pβ1) of the light shielding part for the center of the focus detection pixel is arranged. In this embodiment, the transfer electrodes 330_o and 330_e are arranged at the ends of the photoelectrical conversion part 312 that are opposite to each other in the pupil divide direction of the focus detection pixel. This is because the lowering of the focus detection accuracy is suppressed by making small the asymmetry of the focus detection image caused by a leak light to the photo electrical conversion part 312 from the transfer electrode 330 or a space between the light shielding part 360 and the transfer electrodes 330_o, 330_e. The focus detection pixel in the present invention is not limed to the configuration in the embodiment in FIG. 2. For example, the transfer electrode 330_o may be arranged at an end of the photoelectrical conversion part 312 in the same side as a direction where the opening (for example, Pα1) of the light shielding part is arranged for the center of the focus detection pixel.

The transfer electrode 330_e may be arranged at an end of the photoelectrical conversion part 312 in the same side as a direction where the opening (for example, Pβ1) of the light shielding part is arranged for the center of the focus detection pixel. In this case also, it remains that the transfer electrodes 330_o and 330_e are arranged at ends of the photoelectrical conversion part 312 that are opposite to each other in the pupil divide direction of the focus detection pixel. The asymmetry of the focus detection image caused by the leak light to the photoelectrical conversion part 312 from the transfer electrode 330 or the space between the light shielding part 360 and the transfer electrodes 330_o, 330_e is made small by adding a signal processing, thereby suppressing the lowering of the focus detection accuracy.

FIGS. 4A-4E are diagrams for explaining a part of a manufacturing process of the image-pickup element 108, and explain as an example a focus detection pixel in the first row and first column of the plain diagram of the image-pickup element 108 in FIG. 2.

Figure 4A:
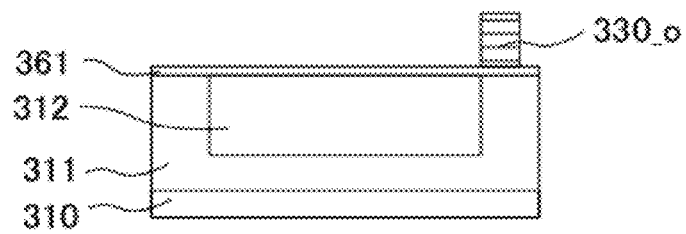
FIGS. 4A-4E are diagrams for explaining a manufacture process of the image-pickup element of the present invention.

As illustrated in FIG. 4A, a p-well area 311 is formed on an n-silicon substrate 310, and further an n-photoelectrical conversion part 312 is formed on a surface of this well area 311. A silicon dioxide film 361 is formed on the silicon substrate 310 by thermal oxidizing the silicon substrate 310. Further, a polysilicon that is the transform electrode 330_o is formed.

Figure 4B:
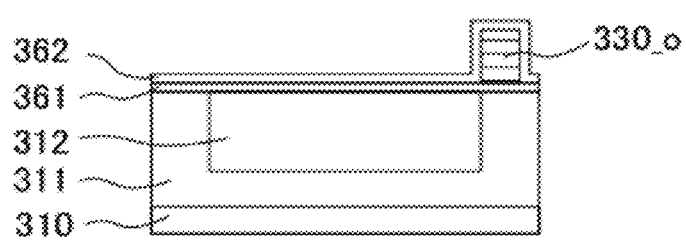

As illustrated in FIG. 4B, a silicon nitride film 362 that is a first transparent insulating film is formed in a whole of the image-pickup element 108. The refractive index of the silicon nitride film 362 that is the first transparent insulating film is about 1.8 and the thickness thereof is about 11 nm.

Figure 4C:
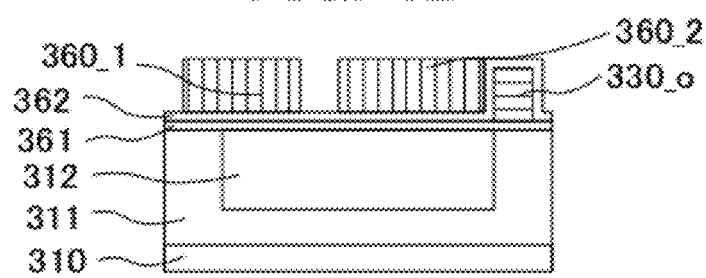

As illustrated in FIG. 4C, the light shielding part 360 that is tungsten is formed on the silicon nitride film 362. The film thickness of the light shielding part 360 substantively has the same film thickness as the polysilicon that is the transfer electrode 330_o, and is formed so as not to overlap the transfer electrode 330_o. Since the light shielding part 360_2 and the transfer electrode 330_o are insulated by the silicon nitride film 362 that is the first transparent insulating film 362, a space between the light shielding part 360_2 and the transfer electrode 330_o can be made small.

Figure 4D:
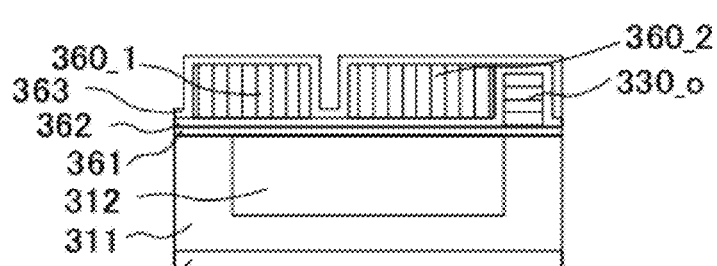

As illustrated in FIG. 4D, a silicon nitride film 363 that is a second transparent insulating film is formed in a whole of the image-pickup element 108 so as to cover the light shielding part 360. The refractive index of the silicon nitride film 363 that is the second transparent insulating film is about 2.0, and the thickness thereof is about 50 nm.

Figure 4E:
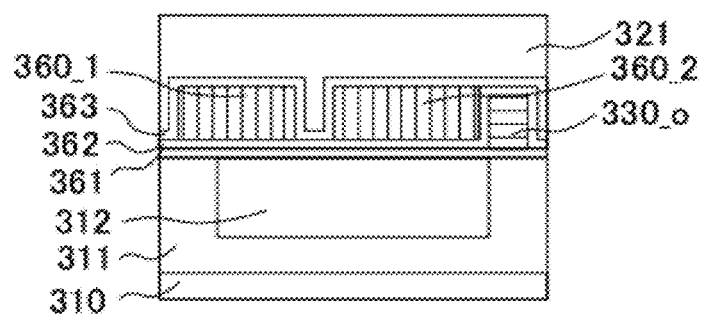

As illustrated in FIG. 4E, the interlayer dielectric film 321 is formed from silicon dioxide film.

After FIG. 4E, an electrode 331, an interlayer dielectric film 322, an electrode 332, an interlayer dielectric film 323, an electrode 333, an interlayer dielectric film 324, a passivation film 340, a planarizing layer 350, a color filter layer 351, a planarizing layer 352, a microlens 353 (not illustrated) are formed.

Since the film thickness of the light shielding part 360 is formed so as not to overlap the transfer electrode 330_o while substantively having the same film thickness as the polysilicon that is the transfer electrode 330_o, it is possible to minimize the thickness of the interlayer dielectric film 321.

In this embodiment, the silicon nitride film 363, which is the second transparent insulating film formed on the light shielding part 360 formed of tungsten, functions as an antireflection film for the light shielding part 360. Similarly, the silicon nitride film 362, which is the first transparent film formed on the transfer electrode 330_o formed of polysilicon, and the silicon nitride film 363, which is the second transparent film, function as an antireflection film for the transfer electrode 330_o. Further, the silicon nitride film 362, which is the first transparent film formed on the photoelectrical conversion part 312, and the silicon nitride film 363, which is the second transparent insulating film, function as an antireflection film for the photoelectrical conversion part 312.

In the plain diagram of the image-pickup element 108 in FIG. 2 of this embodiment, a pair of first and second focus detection pixels arrayed on a part of the image-pickup element 108 has three kinds which have a different relative interval between the centers of rectangle openings due to the light shielding part 360 in order to deal with F values of the image-pickup lens.

Moreover, in this embodiment, when the opening Pα1 formed by the light shielding parts 360_1 and 360_2 in the first row and first column of the focus detection pixel of FIG. 2 is arranged in the left side (−x direction) for the center of the pixels, the transfer electrode 330_o is arranged in the right side (+x direction) for the center of the pixels. In contrast, when the opening Pβ1 formed by the light shielding parts 360_3 and 360_4 in the second row and second column of the focus detection pixel of FIG. 2 is arranged in the right side (+x direction) for the center of the pixels, the transfer electrode 330_e is arranged in the left side (−x direction) for the center of the pixels. Further, in this embodiment, even in rows that the focus detection pixels are not arrayed, the transfer electrodes 330_o and 330_e are, in odd rows, arranged in the right side (+x direction) for the center of the pixels, and are, in even rows, arranged in the left side (−x direction) for the center of the pixels.

The light-receiving characteristic will be described in reference to diagrams for explaining a light-receiving distribution of the focus detection pixel arrayed in the image-pickup element 108 in FIGS. 5A-5F, and diagrams for explaining projections of the light-receiving distribution in FIGS. 6A-6D. The diagrams for explaining the light-receiving characteristic in FIGS. 5A-5F illustrate an example when there is no vignetting in the image-pickup lens 200. Moreover, the projections of the light-receiving distribution in FIGS. 6A-6D are projections of the light-receiving distribution on the pupil of the image-pickup lens 200 of the focus detection pixel in the y direction in FIGS. 5A-5F, and illustrates a line image distribution function (so-called "line image") L that is generated by the focus detection pixel group.

In the plain diagram of the image-pickup element 108 of FIG. 2, the opening Pα1 formed by the light shielding parts 360_1 and 360_2 in a pixel (first focus detection pixel) which is arranged in the first row and first column and enables the focus detection is displaced by a first displacement amount in −x direction for the center of the pixels.

Figures 5A, 5B:
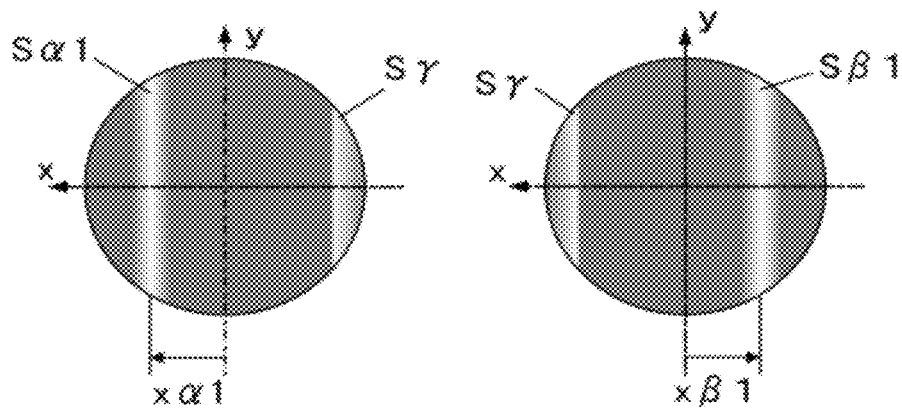
FIGS. 5A-5F are diagrams for explaining a light-receiving distribution of a focus detection pixel arranged in the image-pickup element of the present invention.

FIG. 5A is a diagram for explaining a light-receiving distribution of the focus detection pixel arranged in the first and first column of the image-pickup element 108. The diagram for explaining the light-receiving distribution in FIG. 5A-5F illustrates a light amount distribution that can be received on the pupil of the image-pickup lens 200 when there is no manufacturing error of the image-pickup element 108. In FIG. 5A, a dark and light coloring represents the amount of light that can be received, and the white area has a high light-receiving amount.

The opening Pα1 of the light shielding part in the pixel which is arranged in the first row and first column of the image-pickup element 108 can receive a light from an area Sα1 on the pupil of the image-pickup lens 200. In FIG. 5A, an area Sγ that has a high light-receiving amount in a position in −x direction from the optical axis (intersection of x and y axes in FIG. 5A) of the image-pickup lens 200 is caused by leak light from the space between the light shielding part 360_2 and the transfer electrode 330_o and a partial transmitted light of the transfer electrode 330_o.

In the plain diagram of the image-pickup element 108 of FIG. 2, a pixel (second focus detection pixel) that enables the focus detection and is paired with the pixel arranged at the first row and first column and enabling the focus detection is arranged at a position (the second row and second column in FIG. 2) that is adjacent in an oblique direction. The light shielding parts 360_3 and 360_4 are formed in the pair of pixels enabling the focus detection, and the center of the opening Pβ1 formed by the light shielding parts 360_3 and 360_4 is displaced by the first displacement amount in +x direction for the center of the pixels.

FIG. 5B is a diagram for explaining the light-receiving distribution in the pixel arranged at the second row and second column of the image-pickup element 108. In FIG. 5B, a dark and light coloring represents the amount of light that can be received, and the white area has a high light-receiving amount.

The opening Pβ1 formed by the light shielding parts 360_3 and 360_4 in the pixel which is arranged in the second row and second column of the image-pickup element 108 can receive a light from an area Sβ1 on the pupil of the image-pickup lens 200. In FIG. 5B, an area Sγ that has a high light-receiving amount in a position in +x direction from the optical axis (intersection of x and y axes in FIG. 5B) of the image-pickup lens 200 is caused by leak light from the space between the light shielding part 360_3 and the transfer electrode 330_e and a partial transmitted light of the transfer electrode 330_e.

When there is no manufacturing error in the image-pickup element 108, distances xα1 and xβ1 between the optical axis and each area having high light-receiving amount on the pupil of the image-pickup lens 200 are equal.

In the plain diagram of the image-pickup element 108 of FIG. 2, a pixel enabling the focus detection and formed by the light shielding part 360_5 and 360_6 is arranged in a row (fifth row in FIG. 2) that is lined in −y direction and is the fourth row from the first row and first column. In the pixel arranged in the fifth row and first column and enabling the focus detection, the center of the opening Pα2 formed by the light shielding parts 360_5 and 360_6 is displaced in −x direction for the center of the pixels by a second displacement amount that is different from the first displacement amount.

Figures 5C, 5D:
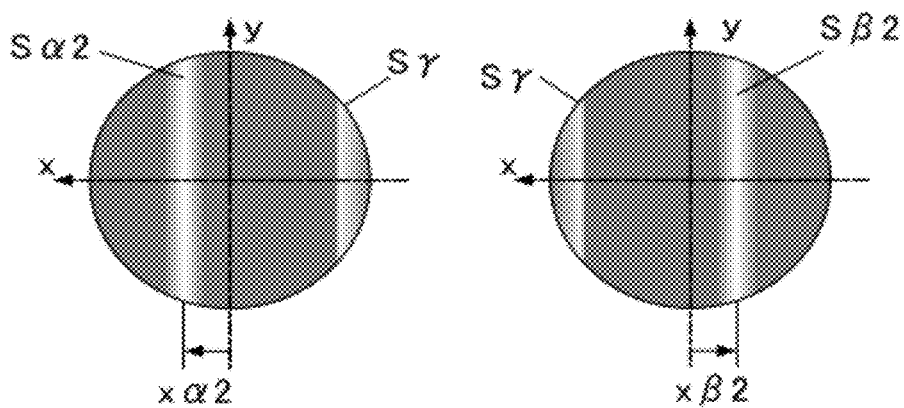

FIG. 5C is a diagram for explaining the light-receiving distribution in the pixel arranged at the fifth row and first column of the image-pickup element 108. In FIG. 5C, a dark and light coloring represents the amount of light that can be received, and the white area has a high light-receiving amount.

The opening Pα2 formed by the light shielding parts 360_5 and 360_6 in the pixel which is arranged in the fifth row and first column of the image-pickup element 108 can receive a light from an area Sα2 on the pupil of the image-pickup lens 200. In FIG. 5C, an area Sγ that has a high light-receiving amount in a position in −x direction from the optical axis (intersection of x and y axes in FIG. 5C) of the image-pickup lens 200 is caused by leak light from the space between the light shielding part 360_6 and the transfer electrode 330_o and a partial transmitted light of the transfer electrode 330_o.

In the plain diagram of the image-pickup element 108 of FIG. 2, a pixel that enables the focus detection and is paired with the pixel enabling the focus detection and arranged at the fifth row and the first column is arranged at a position (the sixth row and second column in FIG. 2) that is adjacent in an oblique direction. The light shielding parts 360_7 and 360_8 are similarly formed in the pair of pixels enabling the focus detection, and the center of the opening Pβ2 formed by the light shielding parts 360_7 and 360_8 is displaced by the second displacement amount in +x direction for the center of the pixels.

FIG. 5D is a diagram for explaining the light-receiving distribution in the pixel arranged at the sixth row and second column of the image-pickup element 108. In FIG. 5D, a dark and light coloring represents the amount of light that can be received, and the white area has a high light-receiving amount.

The opening Pβ2 formed by the light shielding parts 360_7 and 360_8 in the pixel which is arranged in the sixth row and second column of the image-pickup element 108 can receive a light from an area Sβ2 on the pupil of the image-pickup lens 200. In FIG. 5D, an area Sγ that has a high light-receiving amount in a position in +x direction from the optical axis (intersection of x and y axes in FIG. 5D) of the image-pickup lens 200 is caused by leak light from the space between the light shielding part 360_7 and the transfer electrode 330_e and a partial transmitted light of the transfer electrode 330_e.

When there is no manufacturing error in the image-pickup element 108, distances xα2 and xβ2 between the optical axis and each area having high light-receiving amount on the pupil of the image-pickup lens 200 are equal.

In the plain diagram of the image-pickup element 108 of FIG. 2, a pixel enabling the focus detection and formed by the light shielding part 360_9 and 360_10 is arranged in a row (ninth row in FIG. 2) that is lined in −y direction and is further the fourth row from the fifth row and first column. In the pixel arranged in the ninth row and first column and enabling the focus detection, the center of the opening Pα3 formed by the light shielding parts 360_9 and 360_10 is displaced in −x direction for the center of the pixels by a third displacement amount that is different from the first and second displacement amount.

Figures 5E, 5F:
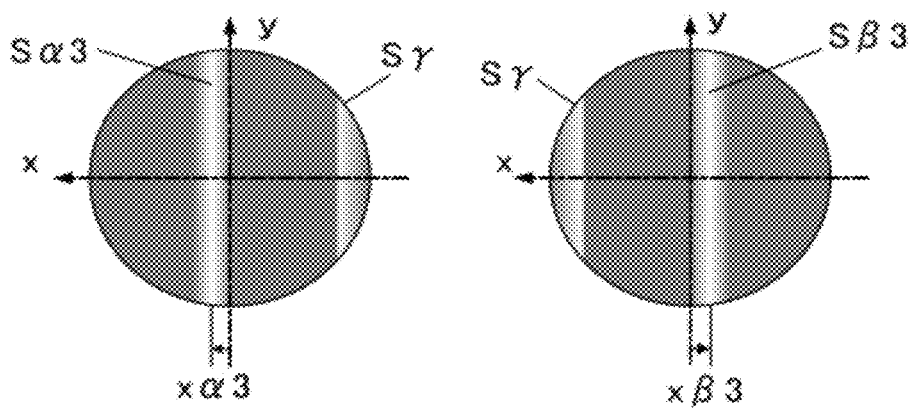

FIG. 5E is a diagram for explaining the light-receiving distribution in the pixel arranged at the ninth row and first column of the image-pickup element 108. In FIG. 5E, a dark and light coloring represents the amount of light that can be received, and the white area has a high light-receiving amount.

The opening Pα3 formed by the light shielding parts 360_9 and 360_10 in the pixel which is arranged in the fifth row and first column of the image-pickup element 108 can receive a light from an area Sα3 on the pupil of the image-pickup lens 200. In FIG. 5E, an area Sγ that has a high light-receiving amount in a position in −x direction from the optical axis (intersection of x and y axes in FIG. 5E) of the image-pickup lens 200 is caused by leak light from the space between the light shielding part 360_10 and the transfer electrode 330_o and a partial transmitted light of the transfer electrode 330_o.

In the plain diagram of the image-pickup element 108 of FIG. 2, a pixel that enables the focus detection and is paired with the pixel enabling the focus detection and arranged at the ninth row and first column is arranged at a position (the tenth row and second column in FIG. 2) that is adjacent in an oblique direction. The light shielding parts 360_11 and 360_12 are similarly formed in the pair of pixels enabling the focus detection, and the center of the opening Pβ3 formed by the light shielding parts 360_11 and 360_12 is displaced by the third displacement amount in +x direction for the center of the pixels.

FIG. 5F is a diagram for explaining the light-receiving distribution in the pixel arranged at the tenth row and second column of the image-pickup element 108. In FIG. 5F, a dark and light coloring represents the amount of light that can be received, and the white area has a high light-receiving amount.

The opening Pβ3 formed by the light shielding parts 360_11 and 360_12 in the pixel which is arranged in the tenth row and second column of the image-pickup element 108 can receive a light from an area Sβ3 on the pupil of the image-pickup lens 200. In FIG. 5F, an area Sγ that has a high light-receiving amount in a position in +x direction from the optical axis (intersection of x and y axes in FIG. 5F) of the image-pickup lens 200 is caused by leak light from the space between the light shielding part 360_11 and the transfer electrode 330_e and a partial transmitted light of the transfer electrode 330_e.

When there is no manufacturing error in the image-pickup element 108, distances xα3 and xβ3 between the optical axis and each area having high light-receiving amount on the pupil of the image-pickup lens 200 are equal.

Further, in pixel positions that are lined in +x direction from the pixel (the first row and first column pixel of FIG. 2) having the opening Pα1 formed by the light shielding parts and enabling the focus detection, pixels having an opening similar to the opening Pα1 and enabling the focus detection are arranged with four pixels period.

Similarly, in pixel positions that are lined in +x direction from the pixel (the second row and second column pixel of FIG. 2) having the opening Pβ1 formed by the light shielding parts and enabling the focus detection, pixels having an opening similar to the opening Pβ1 and enabling the focus detection are arranged with four pixels period.

When the focus state of the image-pickup lens 200 is detected, signals of the focus detection pixel group having the opening similar to the opening Pα1 and of the focus detection pixel group having the opening similar to the opening Pβ1 are output.

Further, in pixel positions that are lined in +x direction from the pixel (the fifth row and first column pixel of FIG. 2) having the opening Pα2 formed by the light shielding parts and enabling the focus detection, pixels having an opening similar to the opening Pα2 and enabling the focus detection are arranged with four pixels period.

Similarly, in pixel positions that are lined in +x direction from the pixel (the sixth row and second column pixel of FIG. 2) having the opening Pβ2 formed by the light shielding parts and enabling the focus detection, pixels having an opening similar to the opening Pβ2 and enabling the focus detection are arranged with four pixels period.

FIGS. 6A-6D illustrate line images L that is generated by the focus detection pixel group and is the projection in y direction of the light-receiving distribution on the pupil of the image-pickup lens 200 of the focus detection pixel in FIGS. 5A-5F.

Figure 6A:
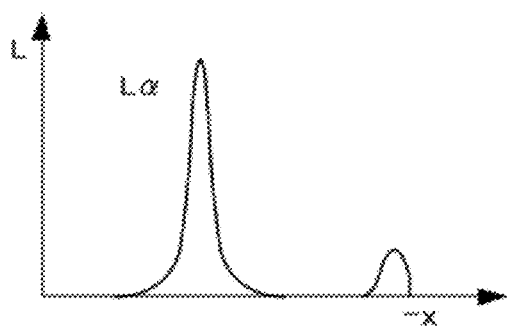
FIGS. 6A-6D are diagrams for explaining projections of the light-receiving distribution of FIGS. 5A-5F.

FIG. 6A illustrates a line image Lα that is generated by the focus detection pixel group having the opening Pα2 arranged in the fifth row in the plain diagram of the image-pickup element 108 of FIG. 2. In the line image Lα, an image having a small intensity is generated in a position distant in −x direction of FIG. 6A from a position of an image having the largest intensity. This image is generated by leak light from the space between the light shielding part 360_6 and the transfer electrode 330_o and a partial transmitted light of the transfer electrode 330_o.

Since the transfer electrode 330 is formed of polysilicon, light having the short wavelength is absorbed but light having the long wavelength is transmitted. Therefore, the light-receiving distribution on the pupil of the image-pickup lens 200 changes depending on the wavelength of light. The line image Lα illustrated in FIG. 6A is substantively equivalent to a line image Lαg for green light in FIG. 6C.

Figure 6B:
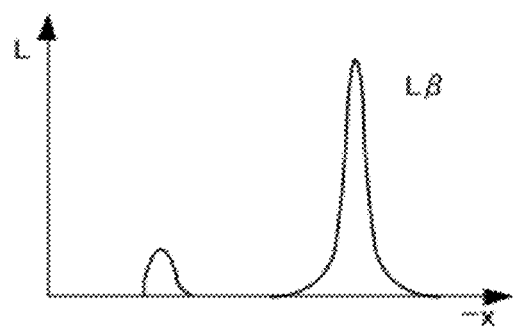
Figure 6C:
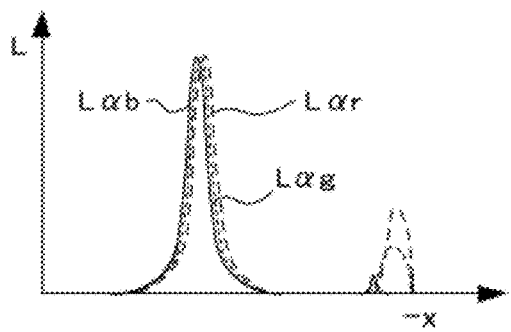

FIG. 6C illustrates the line image Lα for blue light, green light and red light generated by the focus detection pixel group having the opening Pα2 arranged in fifth row in the plain diagram of the image pickup element 108 of FIG. 2. A line image Lαb for blue light is illustrated in solid line. A line image Lαg for green light is illustrated in dotted line. In the line image Lαg, an image due to leak light is generated in a position different in −x direction of FIG. 6C from a position of an image having the largest intensity. Since the image due to the leak light includes a component passing through polysilicon that is the transfer electrode 330_o, the image due to the leak light of the green light is larger than the image due to the leak light of the blue light. A line image Lαr for red light is illustrated in broken line. In the line image Lαr, an image due to leak light is generated in a position different in −x direction of FIG. 6C from a position of an image having the largest intensity. Since the image due to the leak light includes a component transmitted in the polysilicon as the transfer electrode 330_o, the image due to the leak light of the red light is larger than the image due to the leak light of the green light. In the line image Lαb, Lαg and Lαr, the half bandwidth and the position of the image having the largest intensity due to the opening Pα2 of the image-pickup element 108 are affected by the effect of a chromatic aberration or a diffraction of a microlens configuring the image-pickup element, and change depending on the wavelength.

FIG. 6B illustrates a line image Lβ generated by the focus detection pixel group having the opening Pβ2 arranged in sixth row in the plain diagram of the image-pickup element 108 of FIG. 2. In the line image Lβ3, an image having a small intensity is generated in a position distant in +x direction of FIG. 6B from a position of an image having the largest intensity. This image is generated by the leak light from the space between the light shielding part 360_7 and the transfer electrode 330_e and a partial transmitted light of the transfer electrode 330_e.

Figure 6D:
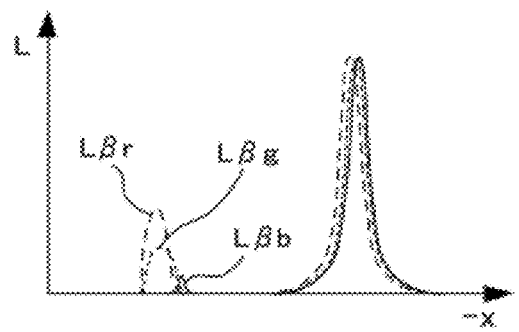

The line image Lβ is substantively equivalent to a line image Lβg for green light in FIG. 6D.

FIG. 6D illustrates the line image Lβ for blue light, green light and red light generated by the focus detection pixel group having the opening Pβ2 arranged in sixth row in the plain diagram of the image pickup element 108 of FIG. 2. A line image Lβp for blue light is illustrated in solid line. A line image Lβg for green light is illustrated in dotted line. In the line image Lβg, an image due to leak light is generated in a position different in +x direction of FIG. 6D from a position of an image having the largest intensity. Since the image due to the leak light includes a component transmitted in the polysilicon as the transfer electrode 330_e, the image due to the leak light of the green light is larger than the image due to the leak light of the blue light. A line image Lβr for red light is illustrated in broken line. In the line image Lβr, an image due to leak light is generated in a position different in +x direction of FIG. 6D from a position of an image having the largest intensity. Since the image due to the leak light includes a component transmitted in the polysilicon as the transfer electrode 330_e, the image due to the leak light of the red light is larger than the image due to the leak light of the green light. In the line image LβB, Lβg and Lβr, the half bandwidth and the position of the image having the largest intensity due to the opening Pβ2 of the image-pickup element 108 are affected by the effect of a chromatic aberration or a diffraction of a microlens configuring the image-pickup element, and change depending on the wavelength.

When the focus state of the image-pickup lens 200 is detected, signals of the focus detection pixel group having the opening Pα2 and the focus detection pixel group having the opening Pβ2 are output.

Further, in pixel positions that are lined in +x direction from the pixel (the ninth row and first column pixel of FIG. 2) having the opening Pα3 and enabling the focus detection, pixels having an opening similar to the opening Pα3 and enabling the focus detection are arranged with four pixels period.

Similarly, in pixel positions that are lined in +x direction from the pixel (the tenth row and second column pixel of FIG. 2) having the opening Pβ3 by the light shielding parts and enabling the focus detection, pixels having an opening similar to the opening Pβ3 and enabling the focus detection are arranged with four pixels period.

When the focus state of the image-pickup lens 200 is detected, signals of the focus detection pixel group having the opening Pα3 and the focus detection pixel group having opening Pβ3 are output.

Since the line image in the first focus detection pixel group having the opening Pα and the line image in the second focus detection pixel group having the opening Pβ are asymmetry as illustrated in diagrams for explaining the projection of the light-receiving distribution in FIGS. 6A-6D, the focus detection image signals output from the image-pickup element 108 are also asymmetry.

In the image-pickup element 108 of the present invention, the transfer electrode 330 of the focus detection pixel is arranged in a direction opposite to a direction where the rectangle openings Pα, Pβ by the light shielding part 360 are arranged with respect to the center of the pixels. Therefore, a leak light component from the space between the light shielding part 360 and the transparent electrode 330 and a transmitted light component of the transfer electrode 330 are generated in the positions different from the position of the image having the largest intensity of the line image L. As a result, in a correlation calculation using the focus detection image signal, the effect due to the leak light component from the space between the light shielding part 360 and the transfer electrode 330 and the transmitted light component of the transfer electrode 330 is reduced, and the lowering of the focus detection accuracy is suppressed.

However, since the asymmetry of the focus detection image signal does not disappear completely, a correction that the asymmetry of the focus detection image signal disappears completely is needed to perform the focus detection with higher accuracy. The following is a correction method where the asymmetry of the focus detection image signal disappears completely.

Figure 7:
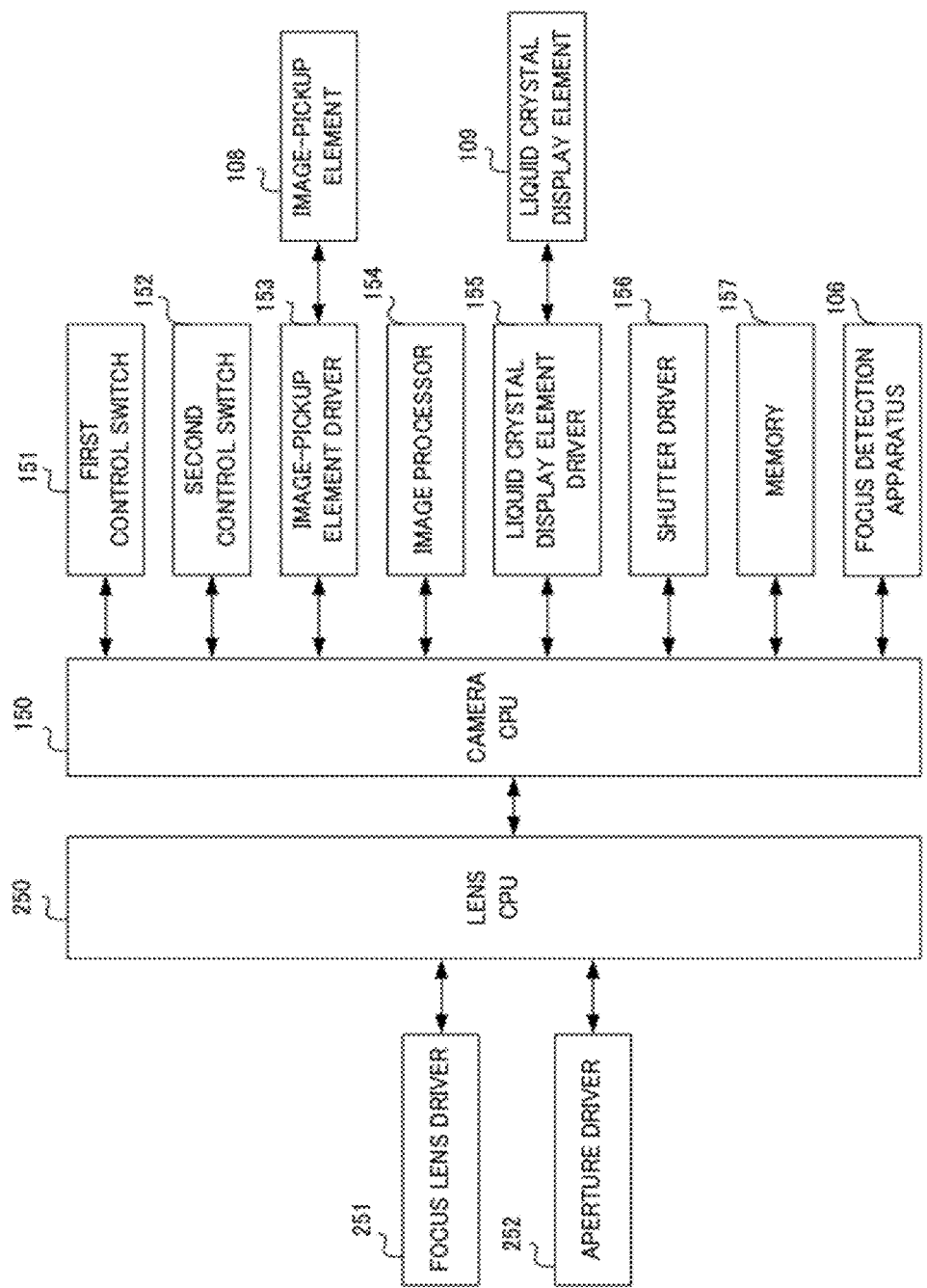
FIG. 7 is a block diagram of an electrical circuit of the optical apparatus of the present invention.

Hereinafter, an image-pickup operation of a camera which is an optical apparatus having the image-pickup element of the present invention will be described in reference to a block diagram of an electrical circuit of a camera in FIG. 7 and flow charts in FIGS. 8A-8B.

In the flow chart of FIG. 8A, when a power (not illustrated) of a camera 100 is turned ON (s100), and a camera CPU 150 that controls the camera 100 confirms a state of a first control switch 151 that indicates a moving image taking (s101). When the first control switch 151 is turned ON and the moving image taking is indicated (s101), the camera CPU 150 retracts the flip-up mirror 101 and the sub-mirror 105 from an image-pickup optical path, and puts the shutter 107 into an opening state via a shutter driver 156.

When the image taking is ready, the camera CPU 150 takes an image of the object by the image-pickup element 108 via the image-pickup element driver 153 (s102). The image taken in the image-pickup element 108 is processed in the image processor 154 as an image for display, and is displayed on the liquid crystal display element 109 via a liquid crystal display element driver 155 (s103). Further, an image processed in the image processor 154 as a storing image is stored to a memory 157 (s104). A storing media may be used for storing an image.

The camera CPU 150 and the image processor 154 are double as a focus detector, and the focus state of the image-pickup lens 200 is detected based on the image taken by the image-pickup element 108 (s200). The focus detection method using the image-pickup element 108 of the present invention will be described later.

When the image-pickup lens 200 is not the in-focus state (s106), the camera CPU 150 transmits to a lens CPU 250 a defocus amount of the image-pickup lens 200 that is detected by the image processor 154. The lens CPU 250 converts the defocus amount of the image-pickup lens 200 into a step driving amount of the focus lens, and drives the focus lens by transmitting a signal to a focus lens driver 251 (s107).

The camera CPU 150 continuously confirm the state of the first control switch 151 that indicates the moving image taking, and continues the moving image taking (s102) if the first control switch 151 is ON (s101).

On the other hand, when the first control switch 151 that indicates the moving image taking is OFF (s101), the camera CPU 150 confirms the second control switch 152 that indicates a still image taking (s108). When the former operation (SW-1) of the sill image taking in the second control switch 152 is not performed, the camera CPU 150 waits ready.

Meanwhile, the former operation (SW-1) for the still image taking is performed in the second control switch 152, the camera CPU 150 detects a focus state of the image-pickup lens 200 based on the output of the focus detection apparatus 106 (s109). The focus detection method in taking a still image is a well-known technique.

When the image-pickup lens 200 is in an in-focus state (s110), the camera CPU 150 confirms a state of the second control switch 152 that indicates the still image taking (s112). On the other hand, when the image-pickup lens 200 is not in the in-focus state (s110), the camera CPU 150 transmits the detected defocus amount of the image-pickup lens 200 to the lens CPU 250. The lens CPU 250 converts the defocus amount of the image-pickup lens 200 into the step driving amount of the focus lens, and drives the focus lens by transmitting a signal to the focus lens driver 251 (s111).

Further, the camera CPU 150 confirms the state of the second control switch 152 that indicates the still image taking (s112). When the latter operation (SW-2) of the still image taking in the second control switch 152 is not performed, the camera CPU 150 waits ready.

On the other hand, the latter operation (SW-2) for the still image taking is performed in the second control switch 152 (s112), the camera CPU 150 retracts the flip-up mirror 101 and the sub-mirror 105 from the image-pickup light path. Moreover, the shutter 107 is put into an opening state via the shutter driver 156, and the opening state of the stop 204 is adjusted via a stop driver 252. When the still image taking is ready, the camera CCPU 150 takes an image of the object by the image-pickup element 108 via the image-pickup element driver 153 (s113). The image taken by the image-pickup element 108 is processed in the image processor 154 to an image for display, and is displayed on the liquid crystal display element 109 via the liquid crystal display element driver 155 (s114). Further, the image processed in the image processor 154 to the storing image is stored to the memory 157 (s115). A storing media may be used for storing an image.

When the store of the image is completed (s115), a sequence of camera image taking operations is ended (s116).

Next, a focus detection flow of the camera having the image-pickup element 108 will be described in detail in reference to a flow chart of FIG. 8B.

First, the camera CPU 150 reads out lens information via the lens CPU 250 to know a vignetting state of a light flux in the image-pickup lens 200 (s201). Next, a focus detection area set by a user is confirmed (s202). Further, an object color in the confirmed focus detection area is determined in the image processor 154 (s203).

Next, the CPU 150 reads out the light-receiving distribution of the focus detection pixel of the image-pickup element 108 that is stored in the memory 157. The memory 157 stores a plurality of kinds of light-receiving distributions that correspond to the difference of the openings and the wavelengths in the light shielding part 360 that shields the photoelectrical conversion 312 of the image-pickup element 108 from a light.

Furthermore, the CPU 150 calculates vignetting in the set focus detection area based on the lens information of the image-pickup lens 200. In the image processor 154, the line image distribution function L is calculated based on the vignetting of the image-pickup lens 200 and the light-receiving distribution corresponding to the objection color in the set focus detection area (s204).

The camera 100 which is an image-pickup apparatus of the present invention enables high accurate focus detection regardless of an object color because the focus state of the image-pickup lens 200 is detected based on the light-receiving characteristic of the image-pickup element 108 that corresponds to the object color as shown below.

For example, the line image distribution function of the focus detection pixel group having the opening Pα2 of the light shielding part 360 arranged in fifth row of the plain diagram of the image-pickup element 108 of FIG. 2 is represented as Lα, and the line image distribution function of the focus detection pixel group having the opening Pβ2 of the light shielding part 360 arranged in sixth row is represented as Lβ. The line image distribution function L has a different characteristic depending on the object color as illustrated in the diagram for explaining the projections in FIGS. 6C and 6D.

When the focus state of the image-pickup lens 200 is detected by using two images generated by light flux passing the different areas of the image-pickup lens 200, the focus detection accuracy is determined according to a position of the center of gravity of a light flux passing the pupil area. An interval between the centers of gravity of light fluxes passing the different pupil areas of the image-pickup lens 200 is called as a base-line length, and the base-line length is calculated in the image processor 154 based on an interval of the center of gravity of the line image distribution function that is a projection of the light-receiving distribution of the focus detection pixel passing the different pupil areas of the image-pickup lens 200.

The center of gravity of the line image distribution function Lα of the focus detection pixel group having the opening Pα2 of the light shielding part 360 is calculated as follows:

[EXPRESSION 1]

$$G_\alpha = \frac{\int_{-\infty}^{\infty} x \cdot L_\alpha(x) dx}{\int_{-\infty}^{\infty} L_\alpha(x) dx} \quad (1)$$

Similarly, the center of gravity of the line image distribution function Lβ of the focus detection pixel group having the opening Pβ2 of the light shielding part 360 is calculated as follows:

[EXPRESSION 2]

$$G_\beta = \frac{\int_{-\infty}^{\infty} x \cdot L_\beta(x) dx}{\int_{-\infty}^{\infty} L_\beta(x) dx} \quad (2)$$

The base-line length G is calculated based on the above calculation result as follows (s 205):

[EXPRESSION 3]

$$G = |G_\alpha - G_\beta| \quad (3)$$

The image-pickup element 108 of this embodiment sets the space between the light shielding part 360 and the transfer electrode 330 to the minimum, and therefore the intensity of the image generated by leak light from the space between the light shielding part 360 and the transfer electrode 330 is small. As a result, the effect of change of the base-line length due to the leak light from the space between the light shielding part 360 and the transfer electrode 330 is set to the minimum.

Next, the bias of the output of the focus detection image is corrected (so called "shading correction") based on the line image distribution functions Lα, Lβ in the image processor 154 (s206).

Further, in the image processor 154, an image shift amount is calculated with a well-known correlation calculation method by using the focus detection image after the shading correction, and a tentative defocus amount is calculated using the base-line length calculated with the expressions (1)-(3) (s207).

It is determined by the CPU 150 whether the calculated tentative defocus amount is within a predetermined range (s208). When it is determined that the tentative defocus amount is within the predetermined range (s208), an image correction processing of the focus detection image is performed to calculate the defocus amount with higher accuracy. On the other hand, when it is determined that the tentative defocus amount is out of the predetermined range (s208), the flow returns to the main routine (s213).

The image correction processing is not performed when the tentative defocus amount is out of the predetermined range is because, when the defocus amount is overlarge, the focus detection image further gets blur and the correlation calculation becomes difficult. On the other hand, when the defocus amount is small, the asymmetry of two images does not change much, and therefore the image correction is not needed. For the two reasons, it is better that the image correction is performed only within the predetermined defocus range.

If it is determined that the tentative defocus amount is within the predetermined range (s208), the CPU 150 primarily makes filters Lα', Lβ', for performing an image correction in order to perform an image correction processing of the focus detection image (s209). The image correction filters Lα', Lβ' is calculated based on the line image distribution function Lα, Lβ that have been already calculated and the calculated tentative defocus amount.

When the image correction filters Lα', Lβ' are made (s209), a filter processing for reducing the asymmetry of the focus detection images Iα, Iβ output from the image-pickup element 108 is performed in the image processor 154 (s210). When the corrected focus detection images are determined as Iα', Iβ', they are calculated as follows:

[EXPRESSION 4]

$$I'_\alpha(x) = \int_{-\infty}^{\infty} I_\alpha(x) \cdot L'_\beta(x - \beta) d\beta \quad (4)$$

[EXPRESSION 5]

$$I'_\beta(x) = \int_{-\infty}^{\infty} I_\beta(x) \cdot L'_\alpha(x - \alpha) d\alpha \quad (5)$$

Since the filter processing is performed for the focus detection image, the base-line length is recalculated by performing the filter processing in the line image distribution function for calculating the base-line length (s211).

First, a correction line image Lcα where the filter processing is performed for the line image distribution function Lα is calculated by the image processor 154 as follows:

[EXPRESSION 6]

$$L_{c\alpha}(x) = \int_{-\infty}^{\infty} L_{\alpha}(x) \cdot L'_{\beta}(x-\beta) d\beta \qquad (6)$$

Therefore, when the center of gravity of the correction line image Lcα is defined as Gα', it is calculated as follows:

[EXPRESSION 7]

$$G'_{\alpha} = \frac{\int_{-\infty}^{\infty} x \cdot L_{c\alpha}(x) dx}{\int_{-\infty}^{\infty} L_{c\alpha}(x) dx} \qquad (7)$$

Similarly, a correction line image Lcβ where the filter processing is performed for the line image distribution function Lβ is calculated by the image processor 154 as follows:

[EXPRESSION 8]

$$L_{c\beta}(x) = \int_{-\infty}^{\infty} L_{\beta}(x) \cdot L'_{\alpha}(x-\alpha) d\alpha \qquad (8)$$

Therefore, when the center of gravity of the correction line image Lcβ is defined as Gβ', it is calculated as follows:

[EXPRESSION 9]

$$G'_{\beta} = \frac{\int_{-\infty}^{\infty} x \cdot L_{c\beta}(x) dx}{\int_{-\infty}^{\infty} L_{c\beta}(x) dx} \qquad (9)$$

Accordingly, when the calculated base-line length is defined as G', it is calculated as follows (s211):

[EXPRESSION 10]

$$G' = |G'_{\alpha} - G'_{\beta}| \qquad (10)$$

Further, by using the corrected focus detection image object image Iα', Iβ' that is calculated by expressions (4) and (5), the image sift amount of the two images is calculated with the well-known correlation calculation in the image processor 154 and the focus state is detected. Furthermore, by using the correction base-lien length calculated by expressions (6)-(10), the defocus amount is calculated (s212). When the defocus amount is calculated, the flow returns to the main routine (s213).

For those configurations, the correction of the images makes possible depending on the vignetting state of the light flux for focus detection, and the in-focus accuracy can be improved.

Next, a case where the aperture 204 of the image-pickup lens 200 of the camera 100 of the present invention is narrowed down will be described.

FIG. 9A is a diagram for explaining a light-receiving distribution of the focus detection pixel arranged in the first row and first column of the image-pickup element 108. The diagrams for explaining a light-receiving distribution in FIGS. 9A-9F illustrates a light amount distribution that can receive light on the pupil of the image-pickup lens 200 when there is no manufacturing error of the image-pickup element 108. In FIG. 9A, a dark and light coloring represents the amount of light that can be received, and the white area has a high light-receiving amount.

The opening Pα1 of the light shielding part in the pixel which is arranged in the first row and first column of the image-pickup element 108 can receive light from an area Sα1 on the pupil of the image-pickup lens 200. An area corresponding to the transfer electrode 330_o or the space between the light shielding part 360_2 and the transfer electrode 330_o is restricted by the aperture 204 of the image-pickup lens 200 and is not generated on the pupil of the image-pickup lens 200.

FIG. 9B is a diagram for explaining the light-receiving distribution of the focus detection pixel arranged in the second row and second column of the image-pickup element 108. In FIG. 9B, a dark and light coloring represents the amount of light that can be received, and the white area has a high light-receiving amount.

The opening Pβ1 due to the light shielding part 360_3, 360_4 in the pixel which is arranged in the second row and second column of the image-pickup element 108 can receive light from an area Sβ1 on the pupil of the image-pickup lens 200. An area corresponding to the transfer electrode 330_e or the space between the light shielding part 360_3 and the transfer electrode 330_e is restricted by the aperture 204 of the image-pickup lens 200 and is not generated on the pupil of the image-pickup lens 200.

FIG. 9C is a diagram for explaining the light-receiving distribution of the focus detection pixel arranged in the fifth row and first column of the image-pickup element 108. In FIG. 9C, a dark and light coloring represents the amount of light that can be received, and the white area has a high light-receiving amount.

The opening Pα2 due to the light shielding part 360_5, 360_6 in the pixel which is arranged in the fifth row and first column of the image-pickup element 108 can receive light from an area Sα2 on the pupil of the image-pickup lens 200. An area corresponding to the transfer electrode 330_o or the space between the light shielding part 360_6 and the transfer electrode 330_o is restricted by the aperture 204 of the image-pickup lens 200 and is not generated on the pupil of the image-pickup lens 200.

FIG. 9D is a diagram for explaining the light-receiving distribution of the focus detection pixel arranged in the sixth row and second column of the image-pickup element 108. In FIG. 9D, a dark and light coloring represents the amount of light that can be received, and the white area has a high light-receiving amount.

The opening Pβ2 due to the light shielding part 360_7, 360_8 in the pixel which is arranged in the sixth row and second column of the image-pickup element 108 can receive light from an area Sβ2 on the pupil of the image-pickup lens 200. An area corresponding to the transfer electrode 330_e or the space between the light shielding part 360_7 and the transfer electrode 330_e is restricted by the aperture 204 of the image-pickup lens 200 and is not generated on the pupil of the image-pickup lens 200.

FIG. 9E is a diagram for explaining the light-receiving distribution of the focus detection pixel arranged in the ninth row and first column of the image-pickup element 108. In FIG. 9E, a dark and light coloring represents the amount of light that can be received, and the white area has a high light-receiving amount.

The opening Pα3 due to the light shielding part 360_9, 360_10 in the pixel which is arranged in the ninth row and first column of the image-pickup element 108 can receive light from an area Sα3 on the pupil of the image-pickup lens 200.

An area corresponding to the transfer electrode 330_o or the space between the light shielding part 360_10 and the transfer electrode 330_o is restricted by the aperture 204 of the image-pickup lens 200 and is not generated on the pupil of the image-pickup lens 200.

FIG. 9F is a diagram for explaining the light-receiving distribution of the focus detection pixel arranged in the tenth row and second column of the image-pickup element 108. In FIG. 9F, a dark and light coloring represents the amount of light that can be received, and the white area has a high light-receiving amount.

The opening Pβ3 due to the light shielding part 360_11, 360_12 in the pixel which is arranged in the tenth row and second column of the image-pickup element 108 can receive light from an area Sβ3 on the pupil of the image-pickup lens 200. An area corresponding to the transfer electrode 330_e or the space between the light shielding part 360_11 and the transfer electrode 330_e is restricted by the aperture 204 of the image-pickup lens 200 and is not generated on the pupil of the image-pickup lens 200.

Further, in pixel positions that are lined in +x direction from the pixel (the first row and first column pixel of FIG. 2) having the opening Pα1 formed by the light shielding parts and enabling the focus detection, pixels having an opening similar to the opening Pα1 and enabling the focus detection are arranged with four pixels period.

Similarly, in pixel positions that are lined in +x direction from the pixel (the second row and second column pixel of FIG. 2) having the opening Pβ1 formed by the light shielding parts and enabling the focus detection, pixels having an opening similar to the opening Pβ1 and enabling the focus detection are arranged with four pixels period.

When the focus state of the image-pickup lens 200 is detected, signals of the focus detection pixel group having the opening similar to the opening Pod and of the focus detection pixel group having the opening similar to the opening Pβ1 are output.

Further, in pixel positions that are lined in +x direction from the pixel (the fifth row and first column pixel of FIG. 2) having the opening Pα2 formed by the light shielding parts and enabling the focus detection, pixels having an opening similar to the opening Pα2 and enabling the focus detection are arranged with four pixels period.

Similarly, in pixel positions that are lined in +x direction from the pixel (the sixth row and second column pixel of FIG. 2) having the opening Pβ2 formed by the light shielding parts and enabling the focus detection, pixels having an opening similar to the opening Pβ2 and enabling the focus detection are arranged with four pixels period.

FIGS. 10A-10B illustrate the line images L that is generated by the focus detection pixel group and is the projection in y direction of the light-receiving distribution on the pupil of the image-pickup lens 200 of the focus detection pixel in FIGS. 9A-9F.

FIG. 10A illustrates the line image Lα generated by the focus detection pixel group having the opening Pα2 arranged in the fifth row in the plain diagram of the image-pickup element 108 of FIG. 2. The line image Lα has a high symmetry because light does not reach the transfer electrode 330_o and the space between the light shielding part 360_6 and the transfer electrode 330_o by narrowing down the aperture 204 of the image-pickup lens 200.

FIG. 10B illustrates the line image Lβ generated by the focus detection pixel group having the opening Pβ2 arranged in sixth row in the plain diagram of the image-pickup element 108 of FIG. 2. The line image Lβ has a high symmetry because light does not reach to the transfer electrode 330_e and the space between the light shielding part 360_7 and the transfer electrode 330_e by narrowing down the aperture 204 of the image-pickup lens 200.

Figure 11:
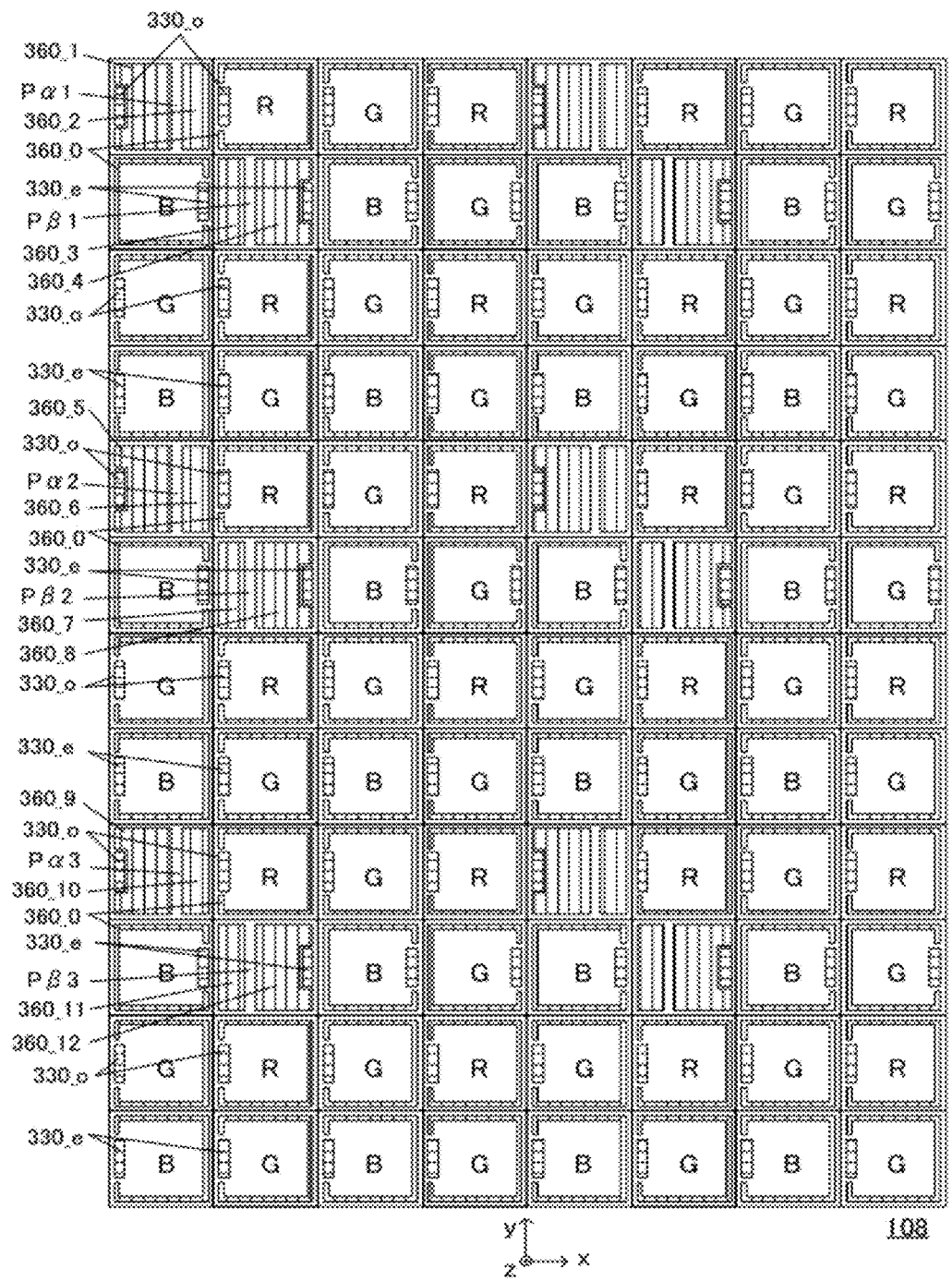
FIG. 11 is a partial plain diagram of the image-pickup element of the present invention (example of deform of FIG. 2).

As described above, in the image-pickup element 108 of the present invention, the transfer electrode 330 of the focus detection pixel is arranged in the direction opposite to the direction where the rectangle openings Pα, Pβ by the light shielding part 360 are arranged with respect to the center of the pixels. Therefore, when the aperture of the image-pickup lens is narrowed down or the vignetting of the image-pickup lens is caused around the image-pickup screen, the effect due to the leak light component from the space between the light shielding part 360 and the transfer electrode 330 and the transmitted light component of the transfer electrode 330 is reduced, and the lowering of the focus detection accuracy is suppressed. This embodiment describes an example where, even in rows that the focus detection pixels are not arrayed, the transfer electrodes 330 are, in odd rows, arranged in the right side (+x direction) for the center of the pixels, and are, in even rows, arranged in the left side (−x direction) for the center of the pixels. However, as illustrated in the plain diagram of the image-pickup element in FIG. 11, the arrangement of the transfer electrode may be configured so as to be aligned all in the same direction from the center of the pixels in rows where the focus detection pixels are not arrayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-111016, filed on May 18, 2011, which is hereby incorporated by reference herein in its entirety.

What is claimed is:

1. An image-pickup element comprising:
   an image-pickup pixel configured to include a microlens, and photoelectrically convert light from an image-pickup lens to generate an image of an object; and
   a first focus detection pixel and a second focus detection pixel, each focus detection pixel configured to be arranged in correspondence with a microlens,
   wherein the first focus detection pixel and the second focus detection pixel each include:
   a photoelectrical conversion part;
   an electrode part arranged at an end of the photoelectrical conversion part so as to cover at least a part of an area of the photoelectrical conversion part; and
   a light shielding part that has an opening and is configured to cover an area different from the at least the part of the area of the photoelectrical conversion part covered by the electrode, and
   wherein the electrode part of the first focus detection pixel and the electrode part of the second focus detection pixel are arranged in the side leaving each by the opening.

2. The image-pickup element according to claim 1,
   wherein the electrode part of the first focus detection pixel is arranged at an end of the photoelectrical conversion part that is opposite to a side where the opening of the light shielding part is arranged with respect to a center of the first focus detection pixel, and
   wherein the electrode part of the second focus detection pixel is arranged at an end of the photoelectrical conversion part that is opposite to a side where the opening of the light shielding part is arranged with respect to a center of the second focus detection pixel.

3. An image-pickup apparatus comprising:
an image-pickup element according to claim 1; and
a focus detector configured to detect a focus state of the image-pickup lens based on an output of the image-pickup element.

4. A camera system comprising:
an image-pickup apparatus according to claim 3; and
an interchangeable lens removably mounted on the image-pickup apparatus.

5. The image-pickup element according to claim 1, wherein the first focus detection pixel and the second focus detection pixel are configured to receive light having passed through a part of an area of an exit pupil of the image-pickup lens.

6. The image-pickup element according to claim 1, wherein the electrode part of the first focus detection pixel and the electrode part of the second focus detection pixel are arranged at ends of the photoelectrical conversion part that are opposite to each other.

7. The image-pickup element according to claim 1, wherein the electrode part of the first focus detection pixel and the electrode part of the second focus detection pixel are arranged at ends of the photoelectrical conversion part that are opposite to each other in a pupil dividing direction of the first focus detection pixel and the second focus detection pixel.

* * * * *